(12) United States Patent
Hayner et al.

(10) Patent No.: US 8,156,805 B2
(45) Date of Patent: Apr. 17, 2012

(54) MEMS INERTIAL SENSOR WITH FREQUENCY CONTROL AND METHOD

(75) Inventors: David A. Hayner, Austin, TX (US);
Keith L. Kraver, Gilbert, AZ (US);
Dejan Mijuskovic, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 446 days.

(21) Appl. No.: 12/424,281

(22) Filed: Apr. 15, 2009

(65) Prior Publication Data

US 2010/0263445 A1   Oct. 21, 2010

(51) Int. Cl.
*G01C 19/00* (2006.01)
*G01P 3/44* (2006.01)
*G01P 9/00* (2012.01)
*G01P 15/08* (2006.01)

(52) U.S. Cl. .............. 73/504.12; 329/360; 702/104; 708/819; 708/827

(58) Field of Classification Search .......... 73/504.12
See application file for complete search history.

(56) References Cited

U.S. PATENT DOCUMENTS

| 5,291,607 | A | 3/1994 | Ristic et al. |
| 5,493,248 | A | 2/1996 | Dunn et al. |
| 2003/0123574 | A1* | 7/2003 | Simeon et al. ............... 375/340 |
| 2007/0265791 | A1* | 11/2007 | Valadon ........................ 702/76 |

OTHER PUBLICATIONS

Leland; "Adaptive mode tuning for vibrational gyroscopes" IEEE Transactions on Control Systems Technology, vol. 11, Issue 2, Mar. 2003 pp. 242-247.
Kim et al; "A systematic method for tuning the dynamics of electrostatically actuated vibratory gyros" IEEE Transactions on Control Systems Technology, vol. 14, Issue 1, Jan. 2006 pp. 69-81.
Chen et al; "A control and signal Processing integrated circuit for the JPL-boeing micromachined gyroscopes" IEEE Transactions on Control Systems Technology, vol. 13, Issue 2, Mar. 2005 pp. 286-300.

* cited by examiner

*Primary Examiner* — Lisa Caputo
*Assistant Examiner* — Roger Hernandez-Prewitt
(74) *Attorney, Agent, or Firm* — James L. Clingan, Jr.

(57) ABSTRACT

An inertial sensor has a transducer with a sense resonator. The sense resonator is oscillated. A signal responsive to the oscillation is provided. A first baseband signal and a second baseband signal are provided responsive to the signal responsive to the oscillation of the sense resonator. A signal for controlling a resonance frequency of the sense resonator is provided responsive to performing a Goertzel algorithm on the first baseband signal and the second baseband signal. One use of controlling the resonance frequency is to control an offset between the resonance frequency of the sense resonator and the frequency of the oscillation of drive masses in the sense resonator. Using the Goertzel algorithm is particularly efficient in controlling the resonance frequency.

20 Claims, 4 Drawing Sheets

MEMS INERTIAL SENSOR WITH FREQUENCY CONTROL AND METHOD

BACKGROUND

1. Field

This disclosure relates generally to micro-electro-mechanical systems (MEMS) devices, and more specifically, to a MEMS inertial sensor with frequency control and method.

2. Related Art

In the development of MEMS inertial sensors, a need has arisen to dynamically measure the frequency offset between the drive and sense resonators in a MEMS gyroscope. It would be desirable to provide such dynamic measurement that is characterized by one or more of the following: 1) does not interfere with normal MEMS gyro operations; 2) does not corrupt the MEMS gyro data; 3) tunable and adaptable without hardware design modifications; 4) useful for manufacturing calibration; 5) can be calibrated to absolute frequency offsets; and 6) can recover the injected frequency, reject data and spurious signals, and achieve the same at very low cost.

Further in connection with MEMS gyroscopes, it would be desirable to provide a tunable, low frequency oscillator to allow certain calibration and operational measures. However, the low frequency oscillator should not be derived from the drive resonator. In addition, the silicon die area, power, frequency and amplitude stability of an ASIC based oscillator operating at several hundred Hz is prohibitively expensive. Furthermore, with such a low frequency oscillator, there exists the need for a very narrow bandwidth, low frequency tunable filter. Such a very narrow bandwidth, low frequency filter can be prohibitively expensive to include on an ASIC at the sub-kilo Hertz frequencies.

Accordingly, there is a need for an improved method and apparatus for overcoming the problems in the art as discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, an inertial sensor uses feedback to establish a predetermined differential between a sense resonant frequency, which is the frequency of highest gain, and a drive frequency. A pilot tone is input to a sense resonator which generates a testing signal which is then sensed on an output of the sense resonator. The testing signal is processed to provide a frequency measurement signal that is a measure of a difference between the drive frequency and the sense resonant frequency. This frequency measurement signal is demodulated by the drive frequency to generate a frequency offset signal that is used in a control law to generate a frequency adjust signal. The frequency adjust signal is used as feedback to control the sense resonant frequency. This feedback process is continuous so that as ambient conditions change, such as a temperature change, the difference between the sense resonant frequency and the drive frequency can be maintained at the desired amount. At power down, the last frequency adjust signal may be stored in a non-volatile memory. At the next power-up, the stored frequency adjust signal may be used for establishing the initial sense resonant frequency. This is better understood by reference to the following description and the drawings.

Figure 1:
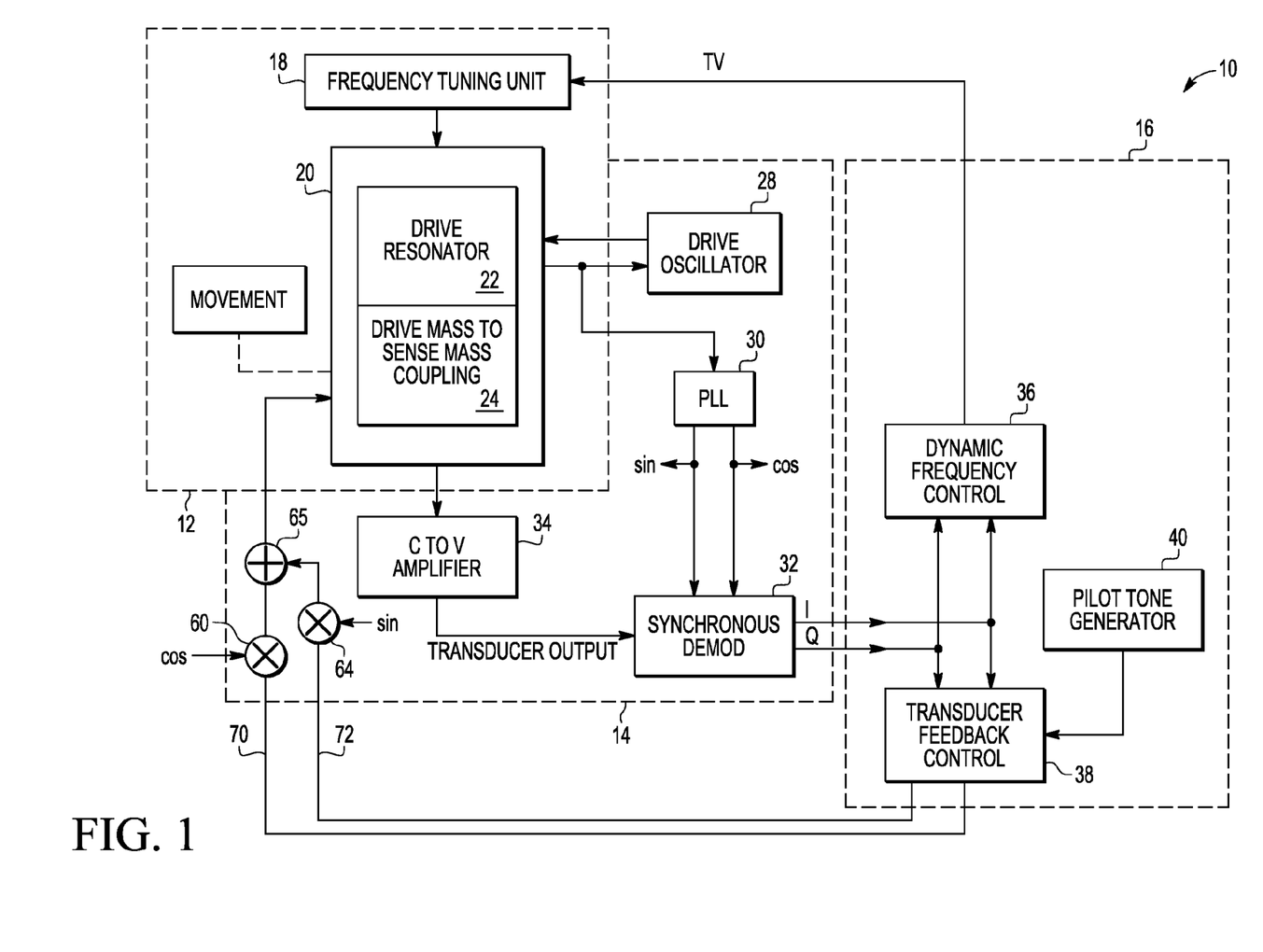
FIG. 1 is a block diagram view of a MEMS inertial sensor with frequency control according to one embodiment of the present disclosure.

FIG. 1 is a block diagram view of a MEMS inertial sensor 10 with frequency control according to one embodiment of the present disclosure. MEMS inertial sensor 10 includes a transducer 12, an application specific integrated circuit (ASIC) 14 and a micro-controller unit (MCU) 16. Transducer system 12 comprises a frequency tuning unit 18, and a sense resonator 20, selected according to the requirements of a given MEMS inertial sensor application. Sense resonator 20 comprises a drive resonator 22 and a drive mass to sense mass coupling 24. Sense resonator 20 functions as a transducer that converts angular rate movement to a capacitance change. ASIC 14 comprises a phase locked loop (PLL) 30, a synchronous demodulator 32, a drive oscillator system 28, a modulator 60, a modulator 64, a summer 65, and a capacitance-to-voltage (C to V) amplifier 34. MCU 16 comprises a dynamic frequency control system 36, a transducer feedback control system 38, and a pilot tone generator 40. Transducer feedback control provides a pair of outputs on lines 70 and 72 coupled to ASIC 14.

Figure 2:
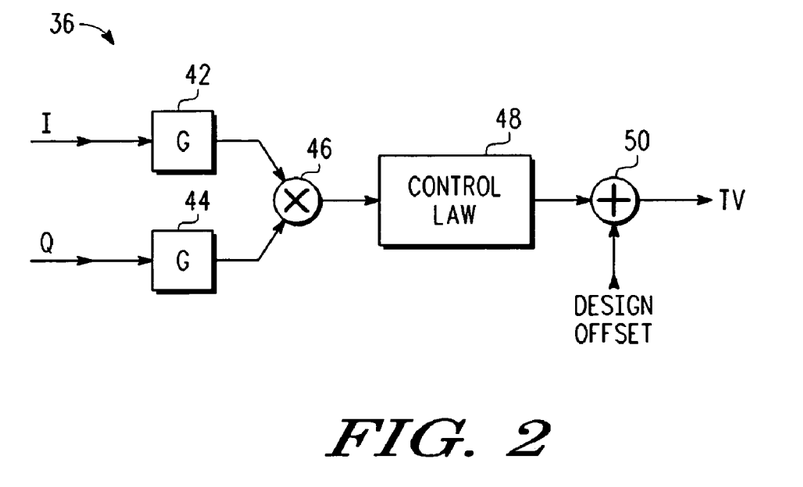
FIG. 2 is a block diagram view of the dynamic frequency control portion of the MEMS inertial sensor of FIG. 1 in greater detail according to one embodiment of the present disclosure.

Shown in FIG. 2 is a block diagram view of the dynamic frequency control portion of MCU 16 of FIG. 1 in greater detail according to one embodiment of the present disclosure. In particular, dynamic frequency control (also referred to herein as extraction means) 36 includes first and second Goertzel algorithm blocks 42 and 44, a multiplier 46, a control law block 48, and a summer 50. The output of dynamic frequency control system 36 provides a tuning voltage (TV) signal to frequency tuning unit 18 that is related to a difference between the sense resonator frequency and the drive frequency.

Figure 3:
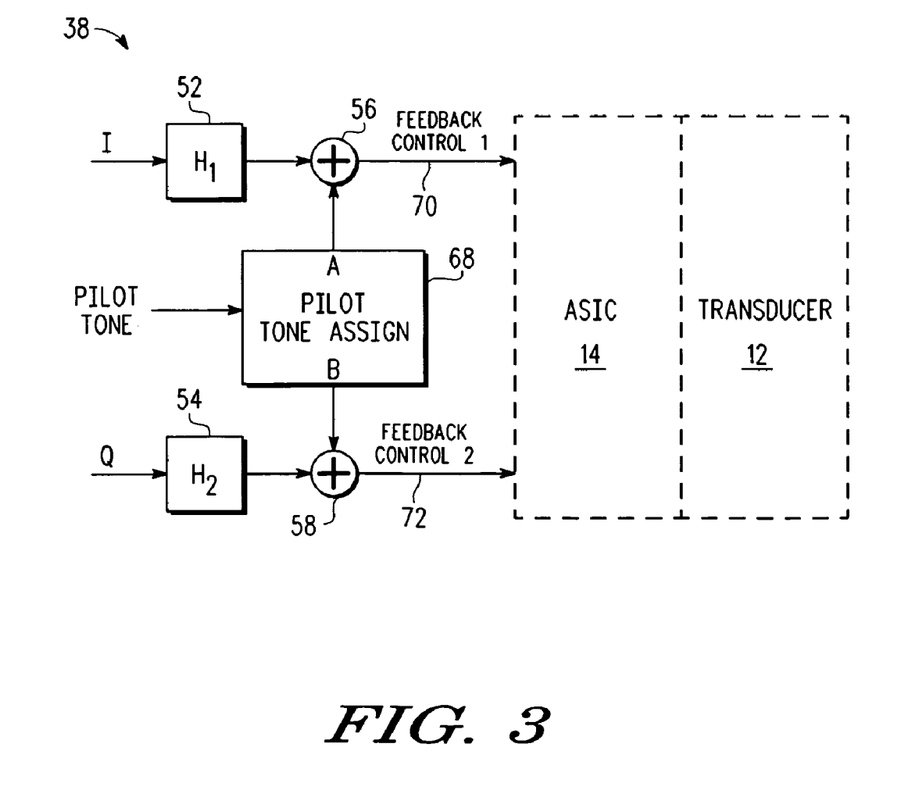
FIG. 3 is a block diagram view of the transducer feedback control portion of the MEMS inertial sensor of FIG. 1 in greater detail according to one embodiment of the present disclosure.

Shown in FIG. 3 is a block diagram view of transducer feedback control 38 of MCU 16 of FIG. 1 in greater detail according to one embodiment of the present disclosure and ASIC 14 and transducer 12. Transducer feedback control 38 comprises transfer function blocks H1 and H2 which may function as filters, indicated by reference numerals 52 and 54, respectively, first and second summers, 56 and 58, respectively, and a pilot tone assign circuit 68. Transfer function block 52 has an input for receiving output signal I and an output. Transfer function block 54 has an input for receiving output signal Q and an output. Adder 56 has a first input coupled to the output of transfer function block 52, a second input, and an output coupled to line 70. Summer 58 has a first input coupled to the output of transfer function block 54, a second input, and an output coupled to line 72. Pilot tone assign circuit 68 has an input coupled to an output of pilot tone generator 40 of FIG. 1 for receiving the pilot tone, a first output coupled to the second input of adder 56, and a second output coupled to the second input of adder 58. Modulator 60 in ASIC 14 shown in FIG. 1 has a first input coupled to the output of adder 56 through line 70, a second input for coupled to PLL 30 for receiving a cosine ($\omega_r t$) and an output. Modulator 64 in ASIC 14 shown in FIG. 1 has a first input coupled to output of adder 58 through line 72, a second input for coupled to PLL 30 for receiving a sine ($\omega_r t$), and an output. Adder 65 has a first input coupled to the output of modulator 60, a second input coupled to the output of modulator 64, and an output coupled to transducer 12, and more particularly to sense resonator 20. The use of transfer functions 52 and 54 modulated with cosine ($\omega_r t$) [cos] and sine ($\omega_r t$) [sin] is known to be useful in providing a pair of signals as feedback to sense resonator 20. Transfer functions 52 and 54 and modulators 60 and 64 and their use in the context of providing a pair signals as feedback to sense resonator 20 is understood by one of ordinary skill in the art. The pilot tone has been added to the pair of signals to provide useful information in setting the offset between the drive frequency and the sense resonant frequency. Thus the pair of signals on lines 70 and 72 provides both a conventional purpose and a purpose related to establishing the offset between the drive frequency and the sense resonant frequency.

Pilot tone assign block 68 includes an input and two outputs. Pilot tone assign block 68 receives a pilot tone or tones from pilot tone generator 40. Responsive to the pilot tone input, the pilot tone assign block 68 is configured to output the pilot tone or tones on the A and/or B outputs. If both A and B outputs are used, they may have different strengths such as 70 percent on one channel and 30 percent on the other. The pilot tone assign block outputs the pilot tone on output A for example to measure the frequency offset of the sense resonator from the drive resonator and a different pilot tone, at a second frequency on output B. This second tone on output B summed in summer block 58 may be used, for instance, to provide additional accuracy in the measurement of the frequency offset between the sense and drive resonators. In one embodiment, the pilot tone output on A is on the order of 500 Hz and the pilot tone output on B is on the order of 550 Hz. Additionally, these pilot tones may be modulated in various ways, amplitude, phase or frequency, to aid in recover of frequency offset information.

Figure 4:
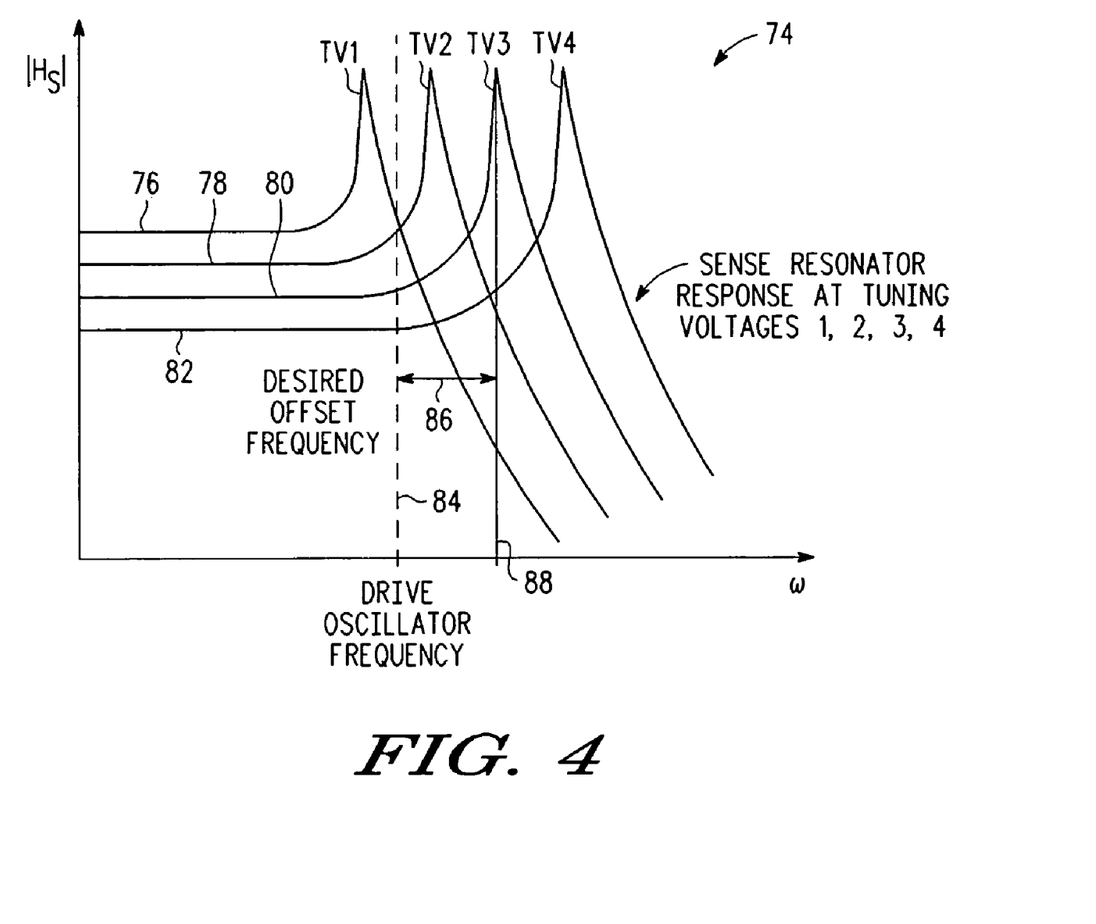
FIG. 4 is a graphical representation view of frequency responses for a sense resonator of the MEMS inertial sensor at various tuning voltages according to the embodiments of the present disclosure.

Shown in FIG. 4 is a graphical representation view 74 of frequency responses for a sense resonator 20 of the MEMS inertial sensor 10 at various tuning voltages (TVs) according to the embodiments of the present disclosure. In particular it shows that the sense resonant frequency varies based upon the tuning voltage, TV1, TV2, TV3, or TV4, that is provided by dynamic frequency control system 36.

Figure 5:
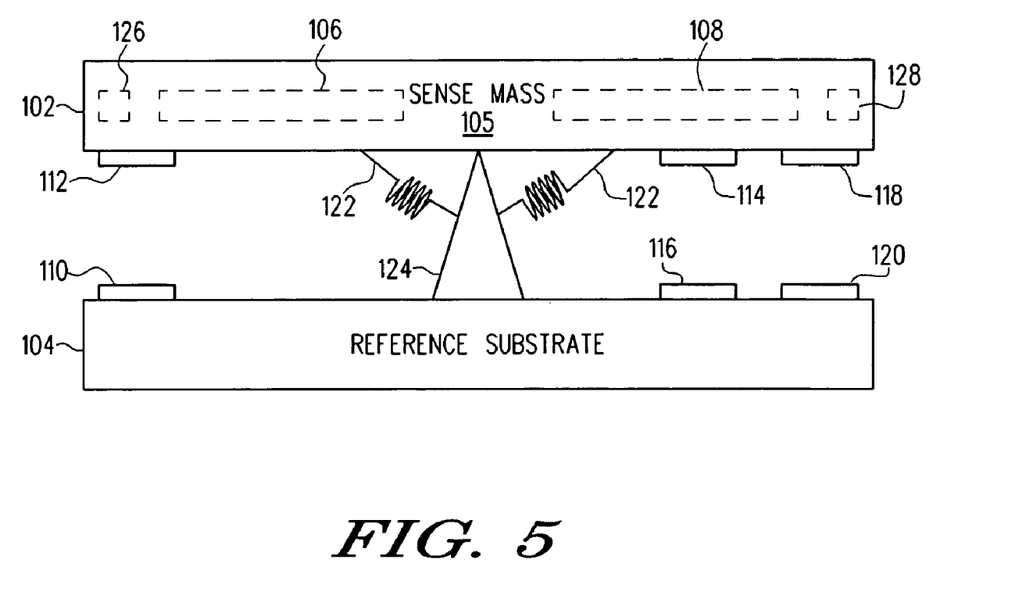
FIG. 5 is a more detailed view of a transducer which is shown in block diagram form FIG. 1.

Shown in FIG. 5 is sense resonator 20 of FIG. 1 comprising a sense element 102, a reference substrate 104, and torsion springs 122. Sense element 102 comprises sense mass 105, a drive mass 106, a drive mass 108, drive and position sense electrodes 126, drive and position sense electrodes 128, frequency tuning electrodes 112, force-feedback electrodes 114, and sense measurement electrodes 118. Sense mass 105 is a rigid body. Reference substrate 104 comprises pivot 124, frequency tuning electrodes 110, force feedback electrodes 116, and sense measurement electrodes 120. Driver resonator 22 shown in FIG. 1 comprises drive springs that are not shown, drive mass 106 and 108, and sense mass 105. Drive mass to sense mass coupling 24 shown in FIG. 1 comprises springs not shown that couple drive mass 106 and 108 to sense mass 105. These springs are relevant to the oscillation frequency of drive mass 106 and 108.

In operation, a drive oscillation frequency is established for drive mass 106 and 108 using drive and position electrodes 126 and 128. In this example, the desired drive oscillation frequency is in the x-direction which is left and right in FIG. 5. The frequency is not precisely predetermined but is known to be within some range based upon manufacturing tolerances. An exemplary range may be 10 percent, but this will likely reduce as manufacturing processes improve. The Drive mass 106 and 108 also has undesirable motion in the vertical (z) direction, which is up and down in FIG. 5, as well as some in the other horizontal (y) direction, which is the direction not visible in FIG. 5. Although drive mass 106 and drive mass 108 are separate masses that oscillate in opposing directions to maintain a net zero momentum, they are also considered together to combine as a mass referenced herein as drive mass 106 and 108. Other masses not shown may also be included in the effective mass that determines the oscillation frequency. When reference substrate 104 experiences a force that generates an angular velocity, this angular velocity is sensed using sense measurement electrodes 118 and 120 to sense oscillation of sense mass 105. In this way transducer 12 is useful in providing a measure of angular velocity of reference substrate 104. To further enhance this ability to provide a measure of angular velocity, transducer 12 further includes frequency tuning electrodes 110 and 112 and force feedback electrodes 114 and 116. A pilot frequency is applied to force-feedback electrodes 114 and 116 that causes sense mass 105 to oscillate. This oscillation is detected using sense measurement electrodes 118 and 120. This result is processed to obtain a measure of the offset between the applied pilot frequency and the resonant frequency.

Drive resonator 22 includes capacitive drive plates (or electrodes) configured on sense mass 105 with respect to drive mass 106 and 108 to facilitate a desired drive mass oscillation. Drive circuit 28, drive masses 106 and 108, the drive springs, and the capacitive drive and sense plates form an oscillator that oscillates at the resonant frequency of drive resonator 22. PLL 30 receives an electrical signal from drive oscillator system 28 which is oscillating at the frequency of drive masses 106 and 108 which is the resonant frequency of drive resonator 22. Drive mass to sense mass coupling 24 represents a characteristic of sense resonator 20 which is defined in part by the mechanical coupling via associated springs of the drive mass to the sense mass and of the sense mass to transducer system 12.

Sense resonator 20 can comprise a number of capacitive sense plates (or electrodes) configured with respect to the sense mass 105 to facilitate a desired capacitive sensing relative to a top surface, which may be considered a reference plane, of reference substrate 104. The sensing corresponds to angular movement of sense mass 105 relative to the reference plane. For example, the capacitive sense plates are configured to enable sensing or measuring of an angular position of the sense mass relative to the reference plane. This relative angular position is proportional to the input angular velocity of the reference plane which is attached to the housing of the device. In one embodiment, sense mass 105 is configured to oscillate, in response to movement, in the z-direction, orthogonal to the resonance direction of drive mass 106 and 108.

Drive oscillator system 28 is coupled to sense resonator 20 and has an output coupled to an input of PLL 30. PLL 30 is configured to be responsive to input from drive oscillator 28. PLL 30 provides first and second outputs to synchronous demodulator 32, wherein the first and second outputs include sine ($\omega_r t$) (sin) signal and cosine ($\omega_r t$) (cos) signal, respectively. C to V amplifier 34 is coupled to transducer system 12, and more particularly to plates 118 and 120 of sense resonator 20. C to V amplifier 34 is configured to receive a capacitance oscillation across plates 118 and 120 which is converted to an output voltage that is representative of the capacitance as it changes due to the oscillation of sense mass 105 relative to the reference plane established by reference substrate 104. The magnitude of the capacitance change due to the oscillation of sense mass 105 is a measure of angular movement so that the output voltage of C to V converter 34 is also a measure of the angular movement of sense resonator 20 but this output voltage is modulated. The modulation frequency is the frequency of the drive oscillator.

Referring again to synchronous demodulator 32, synchronous demodulator 32 is coupled to PLL 30 for receiving the sin and cos output signals of PLL 30. Synchronous demodulator 32 is also coupled to the C to V amplifier 34 for receiving the transducer output signal. Responsive to the sin and cos signals of PLL 30 and responsive to the transducer output signal, the synchronous demodulator demodulates the transducer output and produces a pair of baseband signals, output signals I and Q. The output signals I and Q are representative of the experienced angular velocity. In this example, the output that provides the angular velocity is from output 1. Capacitance-to-voltage amplifier 34 provides an output signal representative of the oscillation of the sense mass which includes the pilot tone which has been added by transducer feedback control 38. Synchronous demodulator 32, while demodulating in conventional fashion, provide output signals I and Q that includes the pilot signal. That is, synchronous demodulator does not remove the pilot frequency. Transducer feedback control 38 adds the pilot frequency to output signals I and Q as part of providing the pair of feedback signals to sense resonator 20. This is a continuous operation with the result that output signals I and Q provide continuous information on the frequency offset between the drive oscillation frequency and the sense resonator's resonant frequency because of the addition of the pilot frequency.

Dynamic frequency control 36 includes first and second inputs for receiving output signals I and Q, respectively, from the synchronous demodulator 32 of ASIC 14. Dynamic frequency control 36 further includes a signal output coupled to a signal input of the frequency tuning unit 18 of the transducer 12. Dynamic frequency control 36 is configured to output the TV signal in response to the baseband I and Q signals of the synchronous demodulator 32. Dynamic frequency control 36 comprises an extraction means for performing a Goertzel algorithm on the pair of baseband signals, multiplying results of performing the Goertzel algorithm, and providing a signal on an output responsive to some function of the results, wherein the output of the extraction means is coupled to the input of the frequency tuning circuit 18. The Geortzel algorithm allows the selective recovery of the pilot tone or tones and rejection of the angular rate information for use in the frequency control system.

Transducer feedback control 38 includes first and second inputs for receiving output signals I and Q, respectively, from the synchronous demodulator 32 of ASIC 14. Transducer feedback control 38 includes the known provision of compensation for quadrature error signals caused by imperfections in driver resonator 22 and customizing the system response to the angular rate input shown as movement in FIG. 1. Transducer feedback control 38, in addition to known functionality, includes a pilot tone input, for receiving a pilot tone output from pilot tone generator 40. Pilot tone generator 40 is configured to generate samples of a predetermined frequency or frequencies in accordance with a specific algorithm designed for generating this signal. In this described example, this may be a sine wave of a predefined amplitude and frequency, but other variations such as a combination of sine waves of various amplitudes, frequencies, and phase shifts may be used. This pilot tone may be generated by a series of microprocessor instructions or dedicated digital hardware or some combination of the two. Transducer feedback control 38 further includes a multi-channel signal output to modulators 60 and 64 which, through summer 65, provide a multi-channel signal output coupled to the sense mass and spring portions of sense resonator 20 of transducer 12. Transducer feedback control 38 is configured to output sense mass signals via the multi-channel signal output in response to (i) output signals I and Q of the synchronous demodulator 32 and (ii) the pilot tones of pilot tone generator 40. The pilot tone generator 40 is configured to provide one or more pilot tones to the transducer feedback control 38, wherein the output of the transducer feedback control 38 includes the pilot frequency or frequencies. Transducer feedback may or may not be required in order to provide some specified level of performance of the transducer. In this description, if various functions of the I and Q signals are feedback to the sense resonator 20, then samples of the pilot tone may be added to one or more of these feedback signals prior to transmission to the sense resonator 20. In cases where feedback is not required, these pilot tones may be driven to the sense resonator 20.

In operation of dynamic frequency control system 36, which may be considered as having an extraction function, Goertzel algorithm blocks 42 and 44 perform a Goertzel algorithm on output signals I and Q, respectively. Responsive to output signal I, Goertzel algorithm block 42 extracts a content thereof at a specified frequency or frequencies and provides a corresponding output signal. Similarly, Goertzel algorithm block 44 receives output signal Q from synchronous demodulator 32 of ASIC 14. Responsive to output signal Q, Goertzel algorithm block 44 extracts a content thereof at a specified frequency or frequencies and provides a corresponding output signal. Multiplier 46 multiplies the signal content of the outputs of the Goertzel algorithm blocks 42 and 44 and produces a combined output signal. The combined output signal is input to the control law block 48. Control law block 48 provides an output according to the control law, which is the PID law in this described example. There are other techniques as well that may used instead of a PID law. Dynamic frequency control system 36 further includes a design offset circuit having an input coupled to the output of the control law block 48 and an output as the output of the extraction means 36. In other words, the design offset circuit comprises summer 50, wherein summer 50 is configured to sum the output of control law block 48 with a design offset signal to produce a frequency control signal on the output of the dynamic frequency control system 36. The frequency control signal is adapted to provide an appropriate signal to frequency tuning unit 18 of transducer 12, and in particular, for providing a frequency tuning adjustment to a spring constant of the sense mass and spring portions of transducer 12 comprising sense resonator 20. The design offset may be chosen in several ways in order to ensure that the control system accomplishes a predefined goal. In some cases, this goal may be to ensure a specific offset frequency between the drive and sense resonators. In another case, it may be used to force a certain change in the offset frequency as a function of time. In the later case, the design offset may not be a constant in time.

According to the embodiments of the present disclosure, a method for frequency control in a MEMS inertial sensor comprises: utilizing MCU generated tones, using a modified Costas loop method, using Goertzel algorithms to extract pilot tones, providing an ability to adjust the tones dynamically to compensate for manufacturing variations, open or closed loop operation, and continuous operation with zero impact to normal operations or data acquisition. The embodiments of the present disclosure advantageously provide for smaller silicon die size, more flexibility, high yields, better performance, and lower manufacturing costs. The embodiments of the present disclosure may be integrated into any number of gyroscope and accelerometer products. According to a further embodiment, the pilot tone oscillator and signal recovery systems of MEMS inertial sensor with frequency control are advantageously low cost, in that the dynamic measurement frequency offset system can be provided virtually free.

By now it should be appreciated that there has been provided an inertial sensor that includes a drive oscillator. The inertial sensor further includes a transducer having a first input coupled to the driver oscillator, an output providing a signal responsive to motion of the transducer having an angular rate, a second input, and a third input. The transducer includes a driver resonator. The inertial sensor further includes a frequency tuning unit having an output coupled to the second input of the transducer for altering a resonant frequency of a sense resonator of the transducer, and an input. The inertial sensor further includes a capacitance-to-voltage amplifier having an input coupled to the output of the sense resonator, and an output. The inertial sensor further includes a synchronous demodulator having an input coupled to the output of the capacitance-to-voltage amplifier and an output providing a pair of baseband signals. The inertial sensor further includes a transducer feedback control system having a pair of inputs for receiving the pair of baseband signals and an output coupled to the third input of the transducer. The inertial sensor further includes extraction means for performing a Goertzel algorithm on the pair of baseband signals, multiplying results of performing the Goertzel algorithm, and providing a signal on an output responsive to the results. The output of the extraction means is coupled to the input of the frequency tuning unit. The inertial sensor may further comprise a tone generator having an output coupled to the transducer feedback control system. The output of the transducer feedback control system may further include a pilot frequency. The Goertzel algorithm may extract content at the pilot frequency. The extraction means may further comprise control law means for receiving the results and providing an output, wherein the output of the extraction means is responsive to the output of the control law means. The extraction means may further comprise a design offset circuit having an input coupled to the output of the control law means and an output as the output of the extraction means. The pair of baseband signals may be an I signal and a Q signal. The extraction means may comprise first Goertzel means for performing the Goertzel algorithm on the I signal; and second Goertzel means for performing the Goertzel algorithm on the Q signal. The extraction means may further comprise multiplier means having a first input coupled to an output of the first Goertzel means and a second input coupled to an output of the second Goertzel means. The inertial sensor may further comprise a pilot tone generator for providing a pilot tone at a pilot frequency to the transducer feedback control system, wherein, the output of the transducer feedback control system includes the pilot frequency.

Also described is an inertial sensor that includes a transducer that is responsive to motion having an angular rate component. The transducer further includes a sense resonator. The sense resonator includes a drive resonator. The inertial sensor further includes a capacitance-to-voltage amplifier, coupled to the transducer, having an output for providing a signal responsive to the motion having the angular rate component. The inertial sensor further includes an oscillator, coupled to the transducer, that establishes a frequency of the drive resonator in a first phase. The inertial sensor further includes a pilot tone generator 40 for providing a pilot tone at a pilot frequency. The inertial sensor further includes feedback means 38 coupled to the pilot tone generator and responsive to the signal provided by the capacitance-to-voltage amplifier for providing a correction signal that includes the pilot frequency to the transducer, wherein the sense resonator responds to the pilot signal with an oscillation in a second phase substantially electrically orthogonal to the first phase. The inertial sensor further includes dynamic frequency control means, responsive to the signal provided by the capacitance-to-voltage amplifier, for providing a signal for use in controlling the resonance frequency of the transducer responsive to the oscillation of the sense resonator in the second phase. The dynamic frequency control means may perform a Goertzel algorithm in providing the signal for controlling the resonance frequency of the transducer. The inertial sensor further includes a demodulator coupled to the capacitance-to-voltage amplifier for generating a first baseband signal I and a second baseband signal Q, wherein the feedback means and the dynamic frequency control means are coupled to the capacitance-to-voltage amplifier through the demodulator. The dynamic frequency control means may include Goertzel means for performing the Goertzel algorithm on the first baseband signal I to provide a first result and for performing the Goertzel algorithm on the second baseband signal Q to provide a second result; and a multiplier for providing an output resulting from multiplying the first result with the second result, wherein the output of the multiplier is used in generating the signal for controlling the resonance frequency of the transducer. Dynamic frequency control means may further comprise offset means for establishing a desired offset between the resonance frequency of sense resonator and the frequency of the drive resonator.

Described also is a method of operating an inertial sensor having a transducer with a sense resonator. The method includes causing an oscillation of the sense resonator. The method further includes providing a signal responsive to the oscillation of the sense resonator. The method further includes providing a first baseband signal and a second baseband signal responsive to the signal responsive to the oscillation of the sense resonator. The method further includes extracting a signal for controlling a resonance frequency of the sense resonator responsive to performing a Goertzel algorithm on the first baseband signal and the second baseband signal. The method may be further characterized by the step of causing an oscillation of the sense resonator being further characterized by the oscillation having: a first frequency in a first phase for use in determining a motion having an angular rate; and a second frequency in a second phase substantially electrically orthogonal to the first phase for use in the step of providing a signal for controlling a resonance frequency of the sense resonator. The step of extracting may be further characterized by the Goertzel algorithm being tuned for the first frequency. The method may further comprise applying a feedback signal to the transducer, wherein the second frequency is introduced to the sense resonator through the feedback signal. The step of extracting may be further characterized as being responsive to multiplying results of the performing the Goertzel algorithm on the first baseband signal and the second baseband signal.

Because the apparatus implementing the present invention is, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, other frequencies than those described may be used. Although a Goertzel algorithm is particularly beneficial, there may be situations in which it may be beneficial to use an alternative such as a bandpass filter instead. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An inertial sensor, comprising:
   a drive oscillator;
   a transducer unit having a first input coupled to the drive oscillator, an output providing a signal responsive to motion of the transducer unit experiencing an angular velocity, a second input, and a third input, wherein the transducer unit includes a sense resonator;
   a frequency tuning unit having an output coupled to the second input of the transducer for altering a resonant frequency of the sense resonator of the transducer, and an input;
   a capacitance-to-voltage amplifier having an input coupled to the output of the sense resonator, and an output;
   a synchronous demodulator having an input coupled to the output of the capacitance-to-voltage amplifier, and an output providing a pair of baseband signals, wherein one of the pair is representative of the angular velocity;
   a transducer feedback control system having a pair of inputs for receiving the pair of baseband signals, and an output coupled to the third input of the transducer unit; and
   extraction means for performing a Goertzel algorithm on the pair of baseband signals, multiplying results of performing the Goertzel algorithm, and providing a signal on an output responsive to the results, wherein the output of the extraction means is coupled to the input of the frequency tuning unit.

2. The inertial sensor of claim 1, further comprising:
   a tone generator having an output coupled to the transducer feedback control system.

3. The inertial sensor of claim 2, wherein the output of the transducer feedback control system includes a pilot frequency.

4. The inertial sensor of claim 3, wherein the Goertzel algorithm extracts content at the pilot frequency.

5. The inertial sensor of claim 4, wherein the extraction means further comprises:
   control law means for receiving the results and providing an output, wherein the output of the extraction means is responsive to the output of the control law means.

6. The inertial sensor of claim 5, wherein the extraction means further comprises:
   a design offset circuit having an input coupled to the output of the control law means and an output as the output of the extraction means.

7. The inertial sensor of claim 1, wherein the pair of baseband signals are an I signal and a Q signal.

8. The inertial sensor of claim 7, wherein the extraction means comprises:
   first Goertzel means for performing the Goertzel algorithm on the I signal; and
   second Goertzel means for performing the Goertzel algorithm on the Q signal.

9. The inertial sensor of claim 8, wherein the extraction means further comprises:
   multiplier means having a first input coupled to an output of the first Goertzel means and a second input coupled to an output of the second Goertzel means.

10. The inertial sensor of claim 1, further comprising:
    a pilot tone generator for providing a pilot tone at a pilot frequency to the transducer feedback control system, wherein,
    the output of the transducer feedback control system includes the pilot frequency.

11. An inertial sensor, comprising:
    a transducer that is responsive to motion having an angular rate component, wherein the transducer comprises a sense resonator, wherein the sense resonator comprises a drive resonator;
    a capacitance-to-voltage amplifier, coupled to the transducer, having an output for providing a signal responsive to the motion having an angular rate component;
    an oscillator, coupled to the transducer, that establishes a frequency of the drive resonator in a first phase;
    a pilot tone generator for providing a pilot tone at a pilot frequency;
    feedback means coupled to the pilot tone generator and responsive to the signal provided by the capacitance-to-voltage amplifier for providing a correction signal that includes the pilot frequency to the transducer, wherein the sense resonator responds to the pilot tone with an oscillation in a second phase substantially electrically orthogonal to the first phase; and
    dynamic frequency control means, responsive to the signal provided by the capacitance-to-voltage amplifier, for providing a signal for use in controlling a resonance frequency of the sense resonator.

12. The inertial sensor of claim 11, wherein the dynamic frequency control means performs a Goertzel algorithm in providing the signal for controlling the resonance frequency of the sense resonator.

13. The inertial sensor of claim 12, further comprising:
    a demodulator coupled to the capacitance-to-voltage amplifier for generating a first baseband signal and a second baseband signal, wherein the feedback means and the dynamic frequency control means are coupled to the capacitance-to-voltage amplifier through the demodulator.

14. The inertial sensor of claim 13, wherein the dynamic frequency control means comprises:
   Goertzel means for performing the Goertzel algorithm on the first baseband signal to provide a first result and for performing the Goertzel algorithm on the second baseband signal to provide a second result; and
   a multiplier for providing an output resulting from multiplying the first result with the second result, wherein
   the output of the multiplier is used in generating the signal for controlling the resonance frequency of the sense resonator.

15. The inertial sensor of claim 14, wherein the dynamic frequency control means further comprises offset means for establishing a desired offset between the resonance frequency of the transducer and the frequency of the sense resonator.

16. A method of operating an inertial sensor having a transducer with a sense resonator, comprising:
   causing an oscillation of the sense resonator;
   providing a capacitive signal responsive to the oscillation of the sense resonator;
   providing a first baseband signal and a second baseband signal responsive to the signal responsive to the oscillation of the sense resonator;
   providing a signal for controlling a resonance frequency of the transducer responsive to performing a Goertzel algorithm on the first baseband signal and the second baseband signal.

17. The method of claim 16, wherein the step of causing an oscillation of the sense resonator is further characterized by the oscillation having:
   a first frequency in a first phase for use in determining a motion having an angular rate; and
   a second frequency in a second phase substantially electrically orthogonal to the first phase for use in the step of providing a signal for controlling a resonance frequency of the sense resonator.

18. The method of claim 17, wherein the step of providing a signal for controlling a resonance frequency of the sense resonator is further characterized by the Goertzel algorithm tuned for the first frequency.

19. The method of claim 18, further comprising:
   applying a feedback signal to the transducer, wherein the second frequency is introduced to the sense resonator through the feedback signal.

20. The method of claim 16, wherein the step of providing a signal for controlling a resonance frequency of the sense resonator is further characterized as being responsive to multiplying results of the performing the Goertzel algorithm on the first baseband signal and the second baseband signal.

* * * * *